(12) United States Patent
Mahadevan et al.

(10) Patent No.: US 12,363,031 B2
(45) Date of Patent: Jul. 15, 2025

(54) SYSTEMS AND METHODS FOR OPTIMIZING ACCESS TO CLOUD RESOURCES USING PREFERENTIAL LOCALIZATION

(71) Applicant: Cisco Technology, Inc., San Jose, CA (US)

(72) Inventors: Satish Kumar Mahadevan, San Ramon, CA (US); Laxmikantha Reddy Ponnuru, San Ramon, CA (US); Pritam Baruah, Fremont, CA (US); Sourav Sen, San Jose, CA (US); Samir Thoria, Saratoga, CA (US); Ramakumara Kariyappa, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/498,928

(22) Filed: Oct. 31, 2023

(65) Prior Publication Data
US 2025/0141796 A1    May 1, 2025

(51) Int. Cl.
  *G06F 15/173* (2006.01)
  *H04L 45/12* (2022.01)
  *H04L 45/28* (2022.01)
  *H04L 45/586* (2022.01)

(52) U.S. Cl.
  CPC .......... *H04L 45/586* (2013.01); *H04L 45/124* (2013.01); *H04L 45/28* (2013.01)

(58) Field of Classification Search
  None
  See application file for complete search history.

(56) References Cited

U.S. PATENT DOCUMENTS

| | | | |
|---|---|---|---|
| 11,929,988 B2 * | 3/2024 | Gupta | H04L 63/102 |
| 11,958,500 B1 * | 4/2024 | Uhlig | G06N 3/08 |
| 2016/0248663 A1 | 8/2016 | Patel et al. | |
| 2019/0104053 A1 | 4/2019 | Cidon et al. | |
| 2019/0372889 A1 | 12/2019 | Michael et al. | |
| 2021/0385149 A1 * | 12/2021 | Suryanarayana | H04L 45/586 |
| 2021/0385155 A1 * | 12/2021 | Suryanarayana | H04L 45/76 |
| 2022/0210225 A1 * | 6/2022 | Shilimkar | H04L 12/4641 |
| 2022/0263789 A1 * | 8/2022 | King | H04L 45/7453 |
| 2023/0080537 A1 * | 3/2023 | Ramanathan | H04L 45/308 709/238 |
| 2023/0115001 A1 | 4/2023 | Warburton et al. | |

FOREIGN PATENT DOCUMENTS

WO    2023018507    2/2023

* cited by examiner

*Primary Examiner* — Phuoc H Nguyen
(74) *Attorney, Agent, or Firm* — Polsinelli P.C.

(57) ABSTRACT

Present disclosure includes determining, at two or more gateway nodes that each communicate with a plurality of branch nodes and a plurality of resources, dynamically a path between each of the plurality of branch nodes and each of the plurality of resources, wherein the path includes one or more virtual routers; generating, at the two or more gateways, dynamically a path length based upon a number of virtual routers each path traverses; automatically translating the path length to an overlay management protocol route preference for each of the plurality of resources.

20 Claims, 8 Drawing Sheets

SYSTEMS AND METHODS FOR OPTIMIZING ACCESS TO CLOUD RESOURCES USING PREFERENTIAL LOCALIZATION

DESCRIPTION OF THE RELATED TECHNOLOGY

The present disclosure relates generally to accessing cloud-based resources from one or more branch locations on a network.

BACKGROUND

A network system connects two or more computing devices and allows the computing devices to exchange data and share resources with each other. The network system uses a system of rules, called communication protocols, to transmit information over physical or wireless technologies. The network systems include connecting devices or components, including switches, routers, and wireless access points, among others. Through the connecting devices, the computing devices can be connected and can communicate with one another and with other networks, such as the Internet.

BRIEF DESCRIPTION OF THE SEVERAL VIEWS OF THE DRAWINGS

In order to describe the manner in which the above-recited and other advantages and features of the disclosure may be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
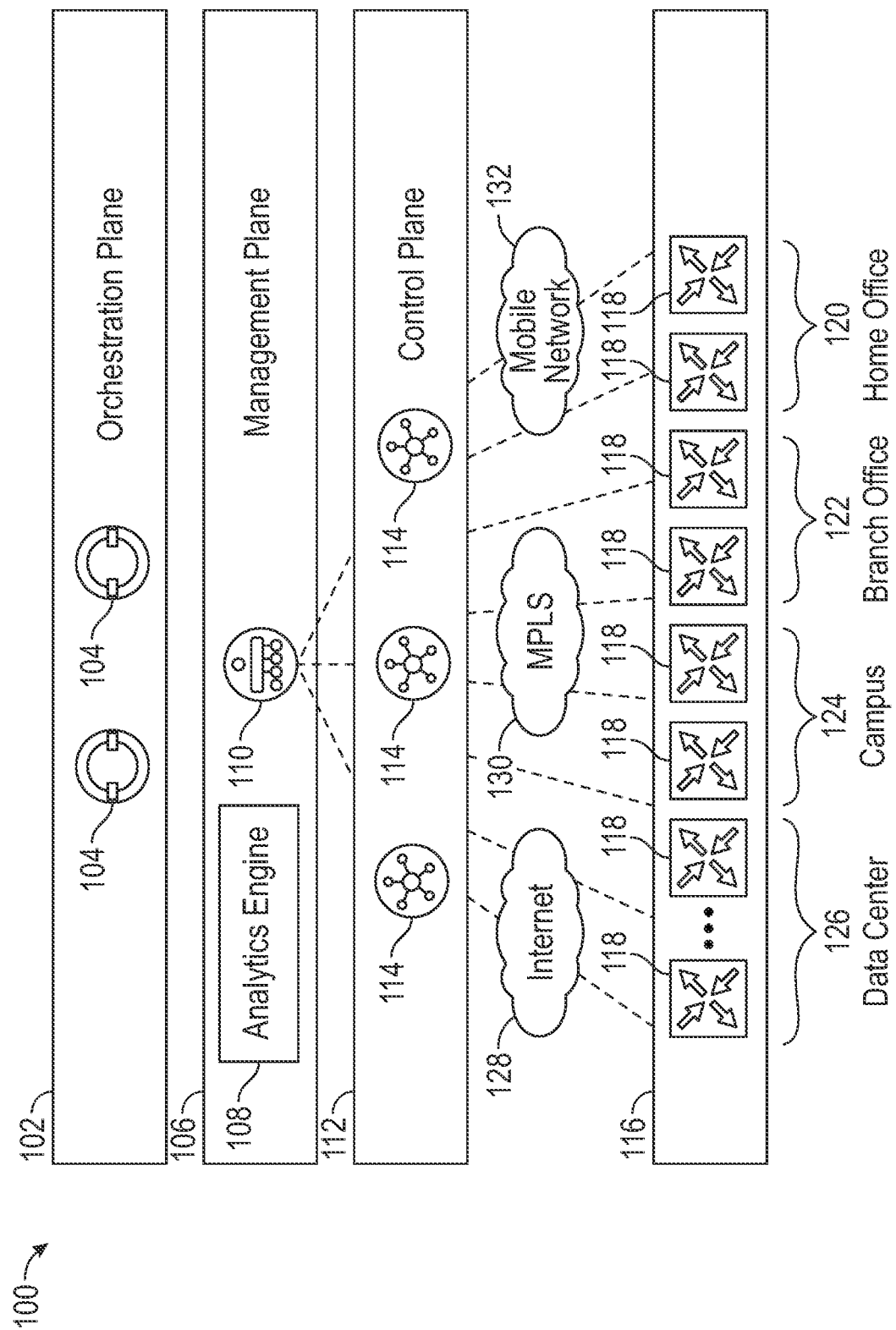
FIG. 1 illustrates an example of a high-level network architecture in accordance with the present disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure may be references to the same embodiment or any embodiment; and such references mean at least one of the embodiments.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative examples mutually exclusive of other embodiments. Moreover, various features are described which may be exhibited by some examples and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The present technology optimizes access to cloud resources using preferential localization. The present technology also determines at two or more gateway nodes that each communicate with a plurality of branch nodes and a plurality of resources dynamically a path between each of the plurality of branch nodes and each of the plurality of resources, wherein the pathways include one or more virtual routers.

In one aspect, a method includes determining, at two or more gateway nodes that each communicate with a plurality of branch nodes and a plurality of resources, dynamically a path between each of the plurality of branch nodes and each of the plurality of resources, wherein the path includes one or more virtual routers. The method can also include generating, at the two or more gateways, dynamically a path length based upon a number of virtual routers each path traverses. The method can also include automatically translating the path length to an overlay management protocol route preference for each of the plurality of resources.

In another aspect a system is described, the system includes a storage configured to store instructions and a processor configured to execute the instructions. The system can have instructions that cause the processor to determine, at two or more gateway nodes that each communicate with a plurality of branch nodes and a plurality of resources, dynamically a path between each of the plurality of branch nodes and each of the plurality of resources, wherein the path includes one or more virtual routers. The system can have instructions that cause the processor to generate at the two or more gateways dynamically a path length based upon a number of virtual routers each path traverses. The system can have instructions that cause the processor to automatically translate the path length to an overlay management protocol route preference for each of the plurality of resources.

In a further aspect, a non-transitory computer-readable storage medium, where the computer-readable storage medium including instructions that when executed by a computing system, cause the computing system to determine, at two or more gateway nodes that each communicate with a plurality of branch nodes and a plurality of resources, dynamically a path between each of the plurality of branch nodes and each of the plurality of resources, wherein the path includes one or more virtual routers. The computer-readable storage medium including instructions that when executed by a computing system, cause the computing system to generate at the two or more gateways dynamically a path length based upon a number of virtual routers each path traverses. the computer-readable storage medium including instructions that when executed by a computing system, cause the computing system to automatically translate the path length to an overlay management protocol route preference for each of the plurality of resources.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include one or more physical or virtual network management appliances 110. In some embodiments, the network management appliances 110 can provide centralized management of the network via a graphical user interface to enable a user to monitor, configure, and maintain the edge network devices 118 and links (e.g., internet transport network 128, MPLS network 130, 4G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively, or in addition, the network management appliances 110 can be a dedicated network management system for a single entity. In some embodiments, physical or virtual Cisco® SD-WAN vManage appliances can operate as the network management appliances 110.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 118.

Figure 2:
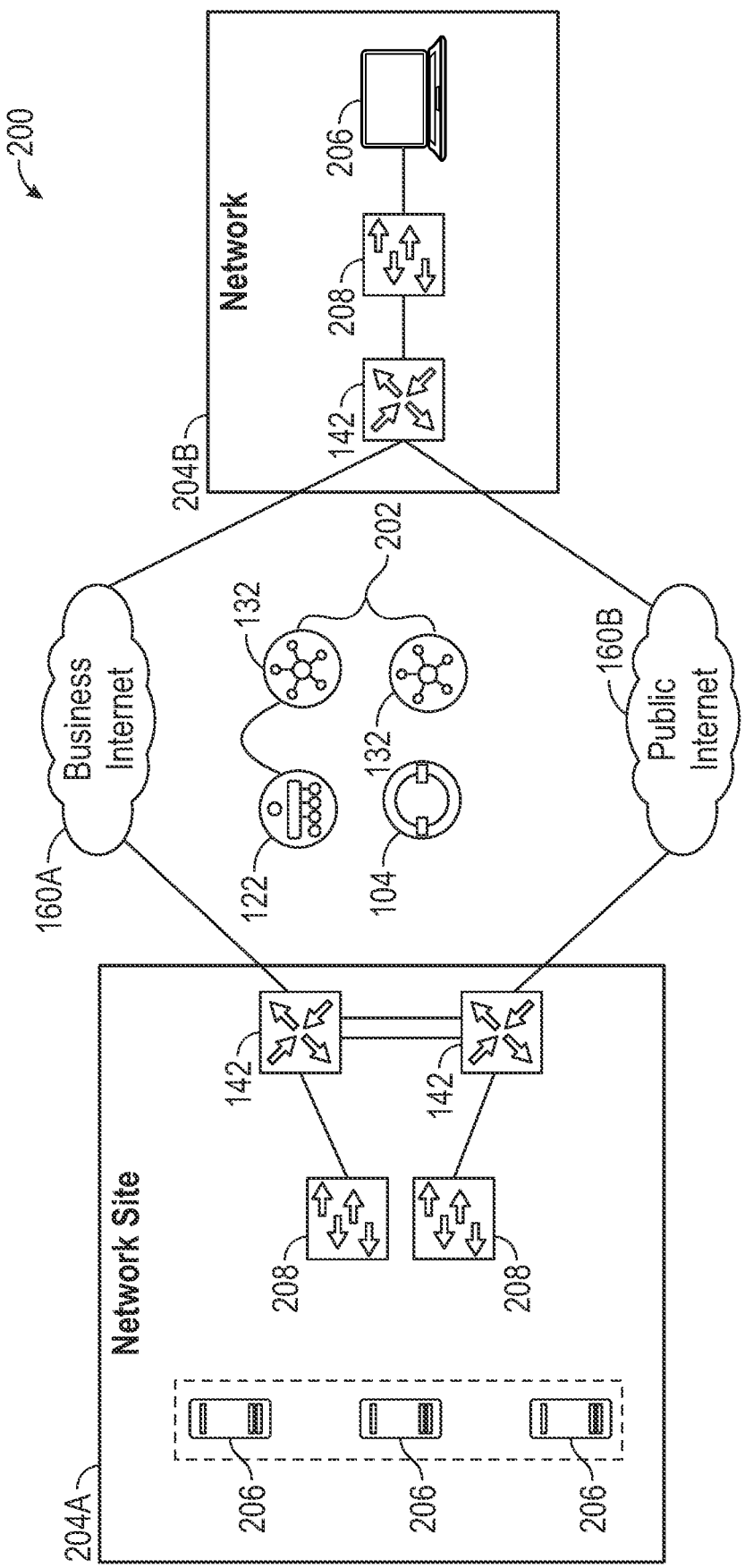
FIG. 2 illustrates an example of a network topology in accordance with the present disclosure.

FIG. 2 illustrates an example of a network topology 200 for showing various aspects of the network architecture 100. The network topology 200 can include a management network 202, a pair of network site 204A and 204B (e.g., the data center 126, the campus network 124, the branch office network 122, the home office network(s) 120, cloud service provider network(s), etc.), and a pair of Internet transport networks 160A and 160B. The management network 202 can include one or more network orchestrator appliances 104, branch office networks 122, and mobile network 132. Although the management network 202 is shown as a single network in this example, one of ordinary skill in the art will understand that each element of the management network 202 can be distributed across any number of networks and/or be co-located with the sites 204A, 204B. In this example, each element of the management network 202 can be reached through either transport network 160A or 160B.

Each site can include one or more endpoint 206 connected to one or more site network device 208, which may also be referred to as an edge device, a network edge device, etc. The endpoint 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoint 206 can also include Internet of Things (IoT) devices or equipment, such as agricultural equipment (e.g., livestock tracking and management systems, watering devices; connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network device 208 can include physical or virtual switches, routers, and other network devices. Although the network site 204A is shown including a pair of site network devices and the site 204B is shown including a single site network device in this example, the site network device 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network device 208 can connect the endpoint 206 to one or more edge network devices 142, and the edge network devices 142 can be used to directly connect to the transport networks 160A, 160B.

In some embodiments, "color" can be used to identify an individual WAN transport network, and different WAN transport networks may be assigned different colors (e.g., MPLS, private1, biz-internet, metro-ethernet, LTE, etc.). In this example, the network topology 200 can utilize a color called "biz-internet" for the Internet transport network 160A and a color called "public-internet" for the Internet transport network 160B.

In some embodiments, each site network device 208 can form a Datagram Transport Layer Security (DTLS) or TLS control connection to the mobile network 132 and connect to any mobile network 132 over each transport network 160A, 160B. In some embodiments, the edge network device 142 can also securely connect to edge network devices in other sites via IPSec tunnels. In some embodiments, the BFD protocol may be used within each of these tunnels to detect loss, latency, jitter, and path failures.

On the edge network devices 142, color can be used to help identify or distinguish an individual WAN transport tunnel (e.g., no same color may be used twice on a single edge network device). Colors by themselves can also have significance. For example, the colors metro-ethernet, MPLS, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3G, biz, internet, blue, bronze, custom1, custom2, custom3, default, gold, green, LTE, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3A:
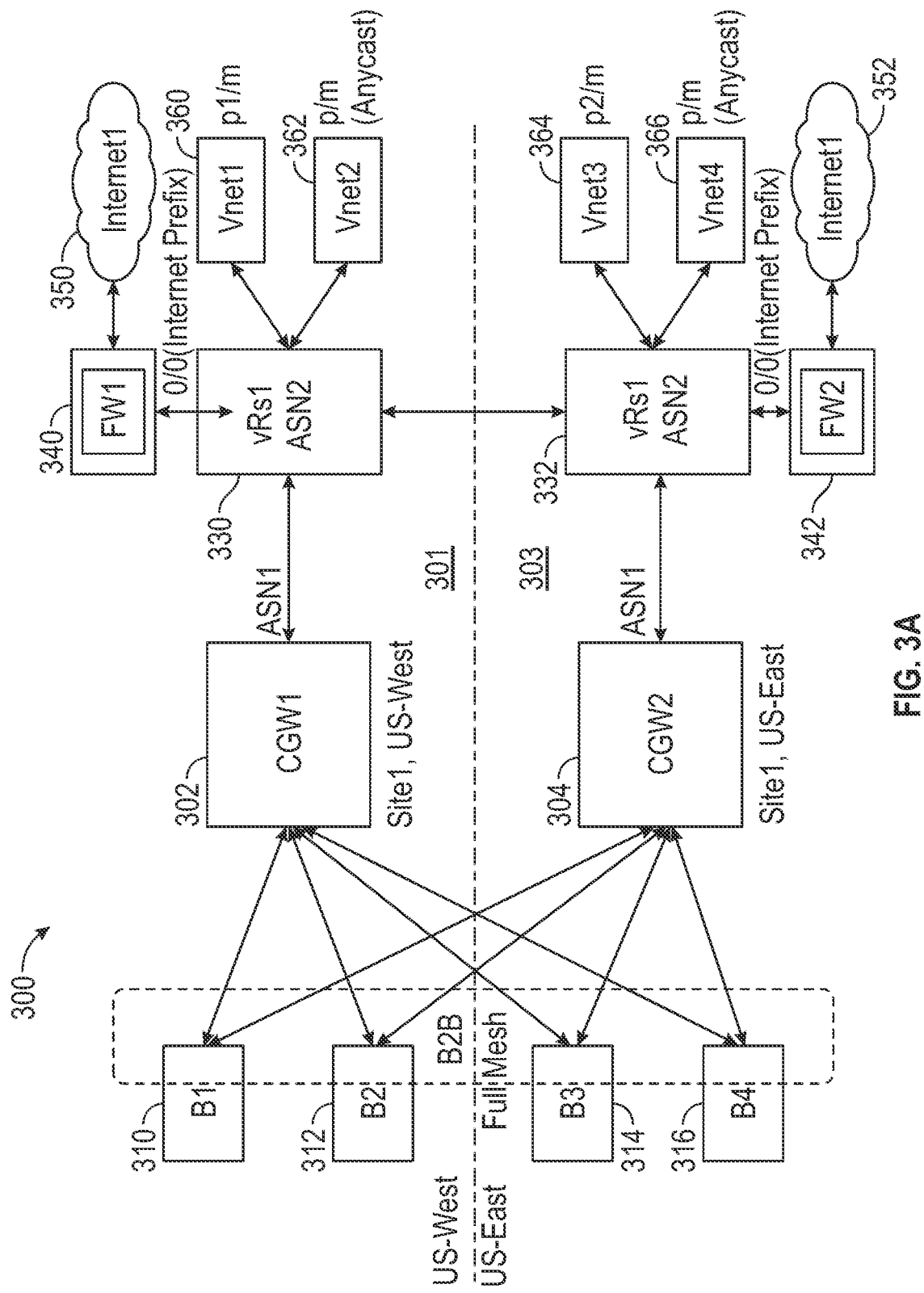
FIG. 3A illustrates an example system configuration for optimizing the connection between one or more branch locations and one or more cloud resources.

FIG. 3A illustrates an example system 300 configuration for optimizing the connection between one or more branch locations 310, 312, 314, 316 and one or more cloud resources. As illustrated the system 300 includes a first gateway node 302 and a second gateway node 304. While only two gateway nodes 302, 304 are illustrated, the present disclosure can include n number of gateway nodes, wherein n is a whole number greater than or equal to two. Additionally, as illustrated, the first gateway node 302 is in a first geographic location 301. The second gateway node 304 can be located in a second geographic location 303. For example, the first geographic location 301 can be the west coast of the United States. Additionally in at least one example, the second geographic location 303 can be the east coast of the United States.

The system 300 can include a first branch 310, a second branch 312, a third branch 314, and a fourth branch 316. In the illustrated example, the first branch 310 and the second branch 312 are located in the first geographic location 301. The third branch 314 and fourth branch 316 are located in the second geographic location 303.

The first gateway node 302 can be coupled to a first virtual routing service 330. The first virtual routing service 330 can include one or more of vHub or TGW. The second gateway node 304 can be coupled to a second virtual routing service 332. The second virtual routing service 332 can include one or more of vHub or TGW. Additionally, a first firewall 340 can be coupled to the first virtual routing service 330 to provide connectivity to the Internet 350. Furthermore, a second firewall 342 can be coupled to the second virtual routing service 332 and provide connectivity to the Internet 352.

The first virtual routing service 330 can be coupled to a first virtual network 360 and a second virtual network 362. The second virtual network 362 can be an anycast virtual network. The second virtual routing service 332 can be coupled to a third virtual network 364 and a fourth virtual network 366. The fourth virtual network 366 can be an anycast virtual network.

As illustrated, each of the branches 310, 312, 314, 316 can access each of the gateway nodes 302, 304. Thus, each of the branches can access the Internet 350, 352 through the corresponding virtual routing service 330, 332. The present disclosure provides an optimal path for the flow to a desired cloud-based resource through a localization by determining an affinity order for the resources. While some cloud resources can be located through any one of the virtual routing services 330, 332, there are some cloud services that might only be located on a single one of the virtual routing services 330, 332.

The present disclosure may include learning at the gateway nodes 302,304 prefixes for the virtual networks 360, 362, 364, 366. Additionally, the gateway nodes 302,304 can advertise branch paths to the cloud. Additionally, the virtual routing services 330, 332 may learn paths from all other virtual routing services 330, 332. The gateway nodes 302, 304 can learn of the path length for each of the virtual networks 360, 362, 364, 366. The path length is determined based on whether the virtual networks 360, 362, 364, 366 are directly attached or reachable through another virtual routing service 330, 332. For example, a path length of one can be assigned to a path in which the virtual routing service is directly coupled with a desired virtual network 360, 362, 364, 366. Additionally, a path length of two can be assigned to a path in which the virtual routing services 330, 332 requires connecting through another one of the virtual routing services 330, 332 to a desired virtual network 360, 362, 364, 366. In another example, the path length can be described as a path preference. The path preference can be such the gateway nodes 302,304 advertise a path preference for the different ones of the virtual networks 360, 362, 364, 366 to the branches 310, 312, 314, 316. For example, the path preference is such that a preference is given to vnet2 362 as compared to vnet4 366 for the first branch 310 and second branch 312. Additionally, if vnet1 360 is the desired virtual network, a path preference for the first gateway node 302 is provided to each of the branches 310, 312, 314, 316. Additionally, return traffic from the virtual network 360, 362, 364, 366 can be over the same path preference.

Similarly, the preference for internet exit can be provided. As illustrated, each of the virtual routing service 330, 332 has a respective internet 350, 352. A path preference for branches 310, 312 can made to go to the internet 350 over the first gateway node 302 as the first gateway node 302 is more proximal to the respective branches 310, 312. Likewise, if internet 352 is desired from the third branch 314 or the fourth branch 316 the path would traverse through the second gateway node 304. While the numbers for internet 350, 352 are different the connection is simply to the internet. In at least one example, the internet 350, 352 can be given a 0/0 prefix. The present disclosure implements a per-prefix-router-affinity to localize internet access as described above. The per-prefix-router-affinity is such that the virtual network affinity is not changed. Additionally, it provides for a fallback to another path if the primary path (most preferred path) is not available. This can have several fallback configurations. Furthermore, the traffic can be configured to be symmetric such that the path from a branch 310, 312, 314, 316 to the internet 350, 352 is the same as from the internet 350, 352 to the branch 310, 312, 314, 316.

In regards to access to the any cast prefixes of vnet2 36 and vnet4 366, the present disclosure proves a per-prefix-affinity like the internet. The path preference is set such that the branches 310, 312, 314, 316 access any case workloads through the closest and/or most preferred gateway node 302, 304 thereby achieving localization. Furthermore, the return traffic can be the same path but in the opposite direction.

Figure 3B:
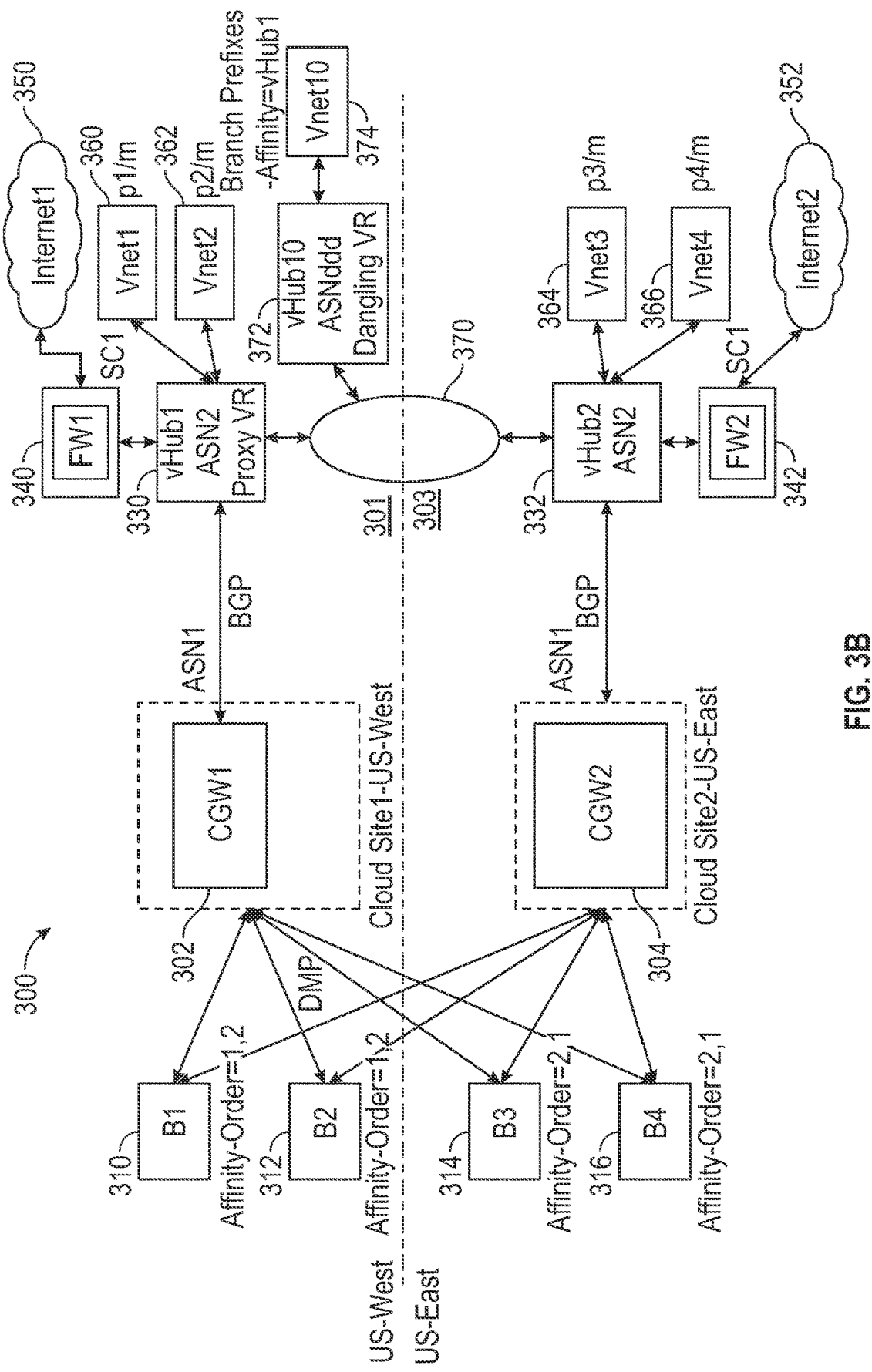
FIG. 3B illustrates an example system configuration for optimizing the connection between one or more branch locations and one or more cloud resources.

FIG. 3B illustrates an example system 300 configuration for optimizing the connection between one or more branch locations and one or more cloud resources. The system of FIG. 3B is substantially the same as FIG. 3A with additional components and a modified component. The modified component is that one of the virtual routing services 330 has been configured to be a virtual proxy routing service (proxy VR).

Additionally, a dangling virtual routing service (vHub10) 372 is included that is coupled through connection 370 to a proxy virtual routing service (for example, proxy VR) 330. vHub10 can have a reserved ASN, which can be applied to all dangling virtual routing services. As illustrated the ASN is ASNddd. The present disclosure includes applying a path map policy on non-proxy gateway nodes to drop the paths of the dangling virtual routing service 372. Additionally, a virtual network (for example, vnet10 as illustrated) 374 can be coupled to the dangling virtual routing service 372. Additionally, only the proxy virtual routing service (vHub1) 330 adverstises the virtual network (vnet10) 374 and vHub10 to the branches 310, 312, 314, 316. This allows for the traffic to proceed only over the first gateway node 302 such that the dangling virtual routing service 372 appears as localized to the proxy VR 330.

Figure 4:
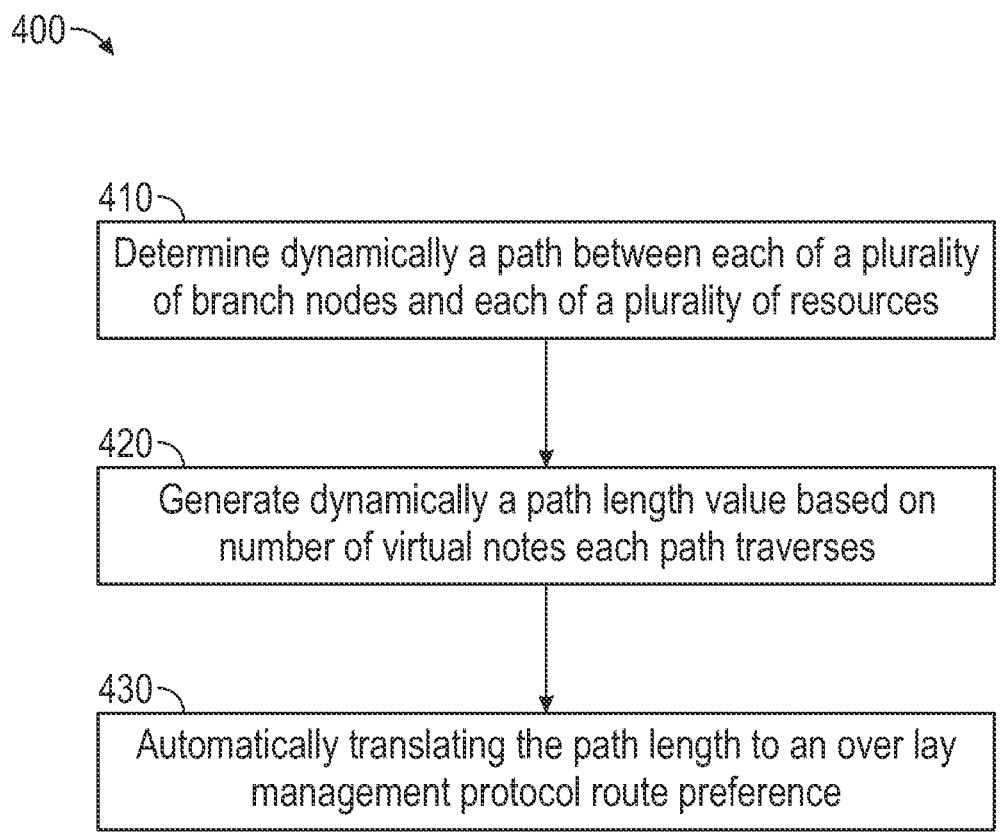
FIG. 4 illustrates an example method for optimizing access to cloud resources using a preferential localization routine.

FIG. 4 illustrates an example method 400 for optimizing the connection between one or more branch locations and one or more cloud resources. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method 400 includes determining at two or more gateway nodes that each communicate with a plurality of branch nodes and a plurality of resources dynamically a path between each of the plurality of branch nodes and each of the plurality of resources at block 410. For example, a gateway node 302,304 illustrated in FIGS. 3A-B may dynamically a path between each of the plurality of branch nodes and each of the plurality of resources. Each of the at least one gateway node 302,304 can communicate with a plurality of branch nodes and a plurality of resources. In at least one example, the resources are one of a virtual network, an anycast virtual network, and/or firewall through which traffic flows to the internet.

According to some examples, the method 400 includes generating, at the two or more gateways, dynamically a path length based upon a number of virtual routers each path traverses at block 420. For example, the gateway node 302,304 illustrated in FIGS. 3A-B may generate at the two or more gateways dynamically a path length based upon a number of virtual routers each path traverses. In at least one example, the path length increases as the number of virtual routers in the path increases.

According to some examples, the method 400 includes automatically translating the path length to an overlay management protocol route preference for each of the plurality of resources at block 430. For example, the gateway node 302,304 illustrated in FIGS. 3A-B may automatically translate the path length to an overlay management protocol route preference for each of the plurality of resources.

Additionally, the method can include generating a per-prefix router affinity score to localize internet access on a given gateway node most closely associated with a given one of the plurality of branch nodes. The per-prefix router affinity score may include multiple affinity scores that span across the plurality of gateways in order of preference to a given gateway.

In at least one example, the method can include providing a redundancy connection, where one or more failures occur through a full-mesh connectivity from the plurality of branch nodes to the two or more gateway nodes. The two or more gateway nodes may include more than four gateway nodes. In yet other examples, the gateway nodes can number between 2-n, wherein n is a whole number greater than 2. Additionally, the number of gateway nodes can change and/or one or more the gateway nodes can experience a connectivity and/or power outage.

In at least one example, the method can establish a dangling virtual routing service coupled to a single one of a plurality of virtual routing services, so that all paths to and from the plurality of resources coupled to the dangling virtual routing service flow through the single one of the plurality of virtual routing services.

Figure 5:
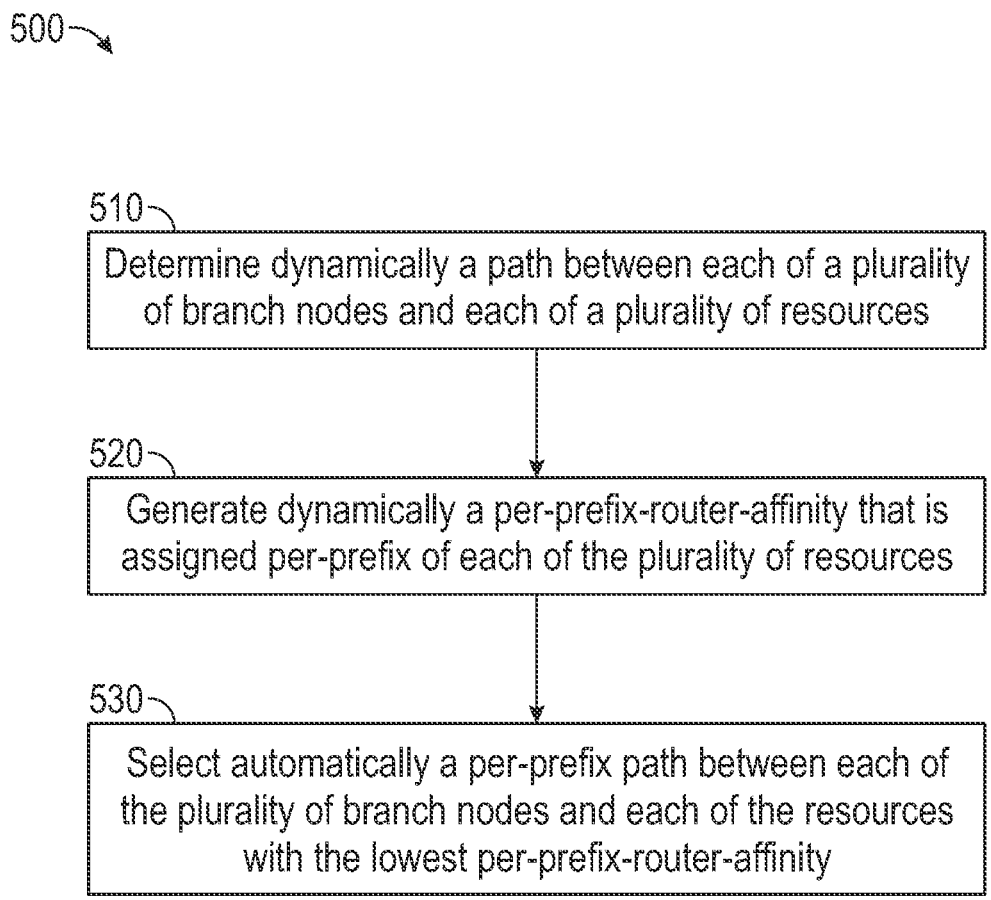
FIG. 5 illustrates an example method for optimizing access to cloud resources using a preferential localization routine.

FIG. 5 illustrates an example method 500 for optimizing the connection between one or more branch locations and one or more cloud resources. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method 500 includes determining at two or more gateway nodes that each communicate with a plurality of branch nodes and a plurality of resources dynamically a path between each of the plurality of branch nodes and each of the plurality of resources at block 510. For example, a gateway node 302,304 illustrated in FIGS. 3A-B may dynamically a path between each of the plurality of branch nodes and each of the plurality of resources. Each of the at least one gateway node 302,304 can communicate with a plurality of branch nodes and a plurality of resources. In at least one example, the resources are one of a virtual network, an anycast virtual network, and/or firewall through which traffic flows to the internet.

According to some examples, the method 500 includes generating, at the two or more gateways, dynamically a per-prefix-router-affinity that is assigned per-prefix of each of the plurality of resources at block 520. For example, the gateway node 302,304 illustrated in FIGS. 3A-B may generate at the two or more gateways dynamically a per-prefix-router-affinity that is assigned per-prefix of each of the plurality of resources.

According to some examples, the method 500 includes automatically selecting, based upon the per-prefix-router-affinity, a per-prefix path between each of the plurality of branch nodes and each of the plurality of resources with the lowest per-prefix-router affinity at block 530. For example, the gateway node 302,304 illustrated in FIGS. 3A-B may automatically select, based upon the per-prefix-router-affinity, a per-prefix path between each of the plurality of branch nodes and each of the plurality of resources with the lowest per-prefix-router affinity.

Figure 6:
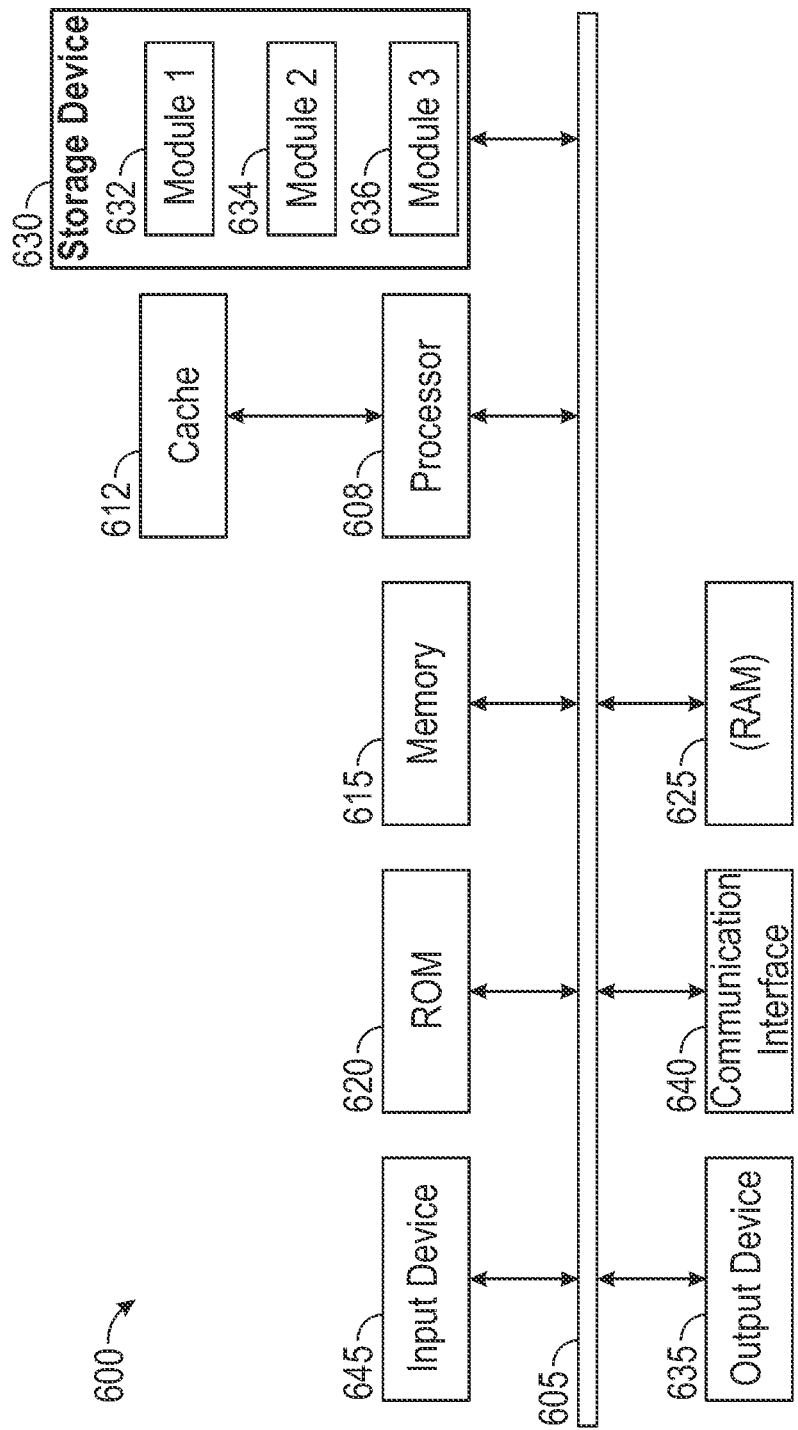
FIG. 6 shows an example of a computing system for implementing certain aspects of the present technology.

In at least one example, the per-prefix-router-affinity includes one or more redundancies FIG. 6 shows an example of computing system 600, which can be, for example any computing device or any component thereof in which the components of the system are in communication with each other using connection 605. Connection 605 can be a physical connection via a bus, or a direct connection to processor 608, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 608 and connection 605 that couples various system components including memory 615, such as read-only memory (ROM) 620 and random-access memory (RAM) 625 to processor 608. Computing system 600 can include a cache of high-speed memory 612 connected directly with, in close proximity to, or integrated as part of processor 608.

Processor 608 can include any general-purpose processor and a hardware service or software service, such as services 632, 634, and 636 stored in storage device 630, configured to control processor 608 as well as a special-purpose processor where software instructions are incorporated into the actual processor design. Processor 608 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 608, it causes the system to perform a function. In some embodiments, a hardware service that performs a particular function can include the software component stored in a computer-readable medium in connection with the necessary hardware components, such as processor 608, connection 605, output device 635, etc., to carry out the function.

Figure 7:
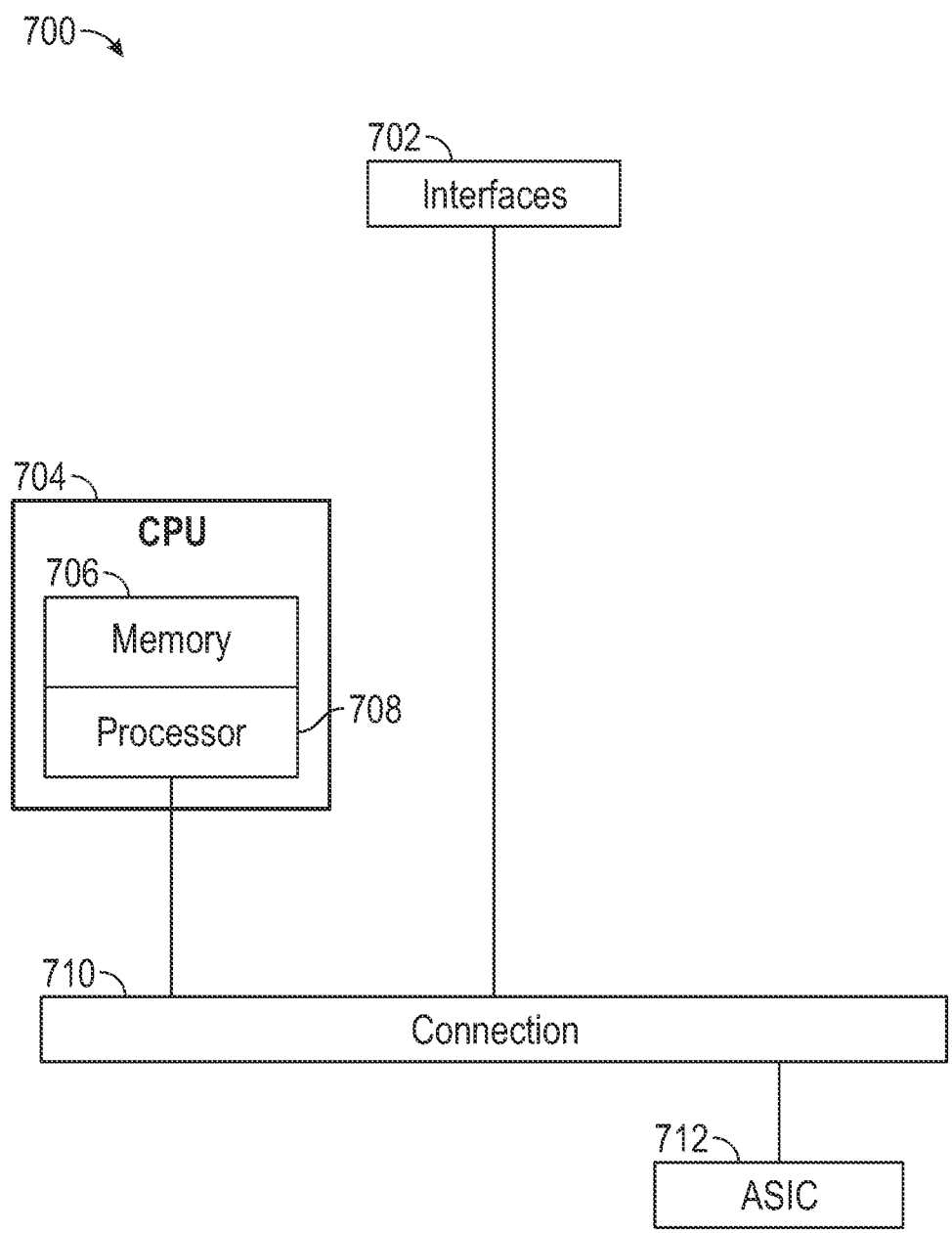
FIG. 7 illustrates an example network device in accordance with the present disclosure.

FIG. 7 illustrates an example network device 700 suitable for performing switching, routing, load balancing, and other networking operations. The example network device 700 can be implemented as switches, routers, nodes, metadata servers, load balancers, client devices, and so forth.

Network device 700 includes a central processing unit (CPU) 704, interfaces 702, and a connection bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL x86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 704) to efficiently perform routing computations, network diagnostics, security functions, etc.

Although the system shown in FIG. 7 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC) 712, which can be configured to perform routing and/or switching operations. The ASIC 712 can communicate with other components in the network device 700 via the bus 710, to exchange data and signals and coordinate various types of operations by the network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. A method comprising: determining at two or more gateway nodes that each communicate with a plurality of branch nodes and a plurality of resources dynamically a path between each of the plurality of branch nodes and each of the plurality of resources, wherein the path includes one or more virtual routers; generating at the two or more gateways dynamically a path length based upon a number of virtual routers each path traverses; automatically translating the path length to an overlay management protocol route preference for each of the plurality of resources.

Aspect 2. The method of Aspect 1, wherein the resources are one of a virtual network, an anycast virtual network, and/or firewall through which traffic flows to internet.

Aspect 3. The method of any of Aspects 1 to 2, wherein the path length increases as the number of virtual routers in the path increases.

Aspect 4. The method of any of Aspects 1 to 3, further comprising generating a per-prefix router affinity score to localize internet access on a given gateway node most closely associated with a given one of the plurality of branch nodes.

Aspect 5. The method of any of Aspects 1 to 4, wherein the per-prefix router affinity score includes multiple affinity scores that span across the plurality of gateways in order of preference to a given gateway.

Aspect 6. The method of any of Aspects 1 to 5, further comprising provide a redundancy connection, where one or more failures occur through a full-mesh connectivity from the plurality of branch nodes to the two or more gateway nodes.

Aspect 7. The method of any of Aspects 1 to 6, wherein the two or more gateway nodes comprise more than four gateway nodes.

Aspect 7.5. The method of any of Aspects 1 to 7, further comprising: establishing a dangling virtual routing service coupled to a single one of a plurality of virtual routing services, so that all paths to and from the plurality of resources coupled to the dangling virtual routing service flow through the single one of the plurality of virtual routing services.

Aspect 8. A system includes a storage (implemented in circuitry) configured to store instructions and a processor. The processor configured to execute the instructions and cause the processor to: determine at two or more gateway nodes and a plurality of branch nodes and a plurality of resources dynamically a path between each of the plurality of branch nodes and each of the plurality of resources, wherein the path includes one or more virtual routers; generate at the two or more gateways dynamically a path length based upon a number of virtual routers each path traverses; automatically translate the path length to an overlay management protocol route preference for each of the plurality of resources.

Aspect 9. The system of Aspect 8, wherein the resources are one of a virtual network, an anycast virtual network, and/or firewall through which traffic flows to internet.

Aspect 10. The system of any of Aspects 8 to 9, wherein the path length increases as the number of virtual routers in the path increases.

Aspect 11. The system of any of Aspects 8 to 10, wherein the processor is configured to execute the instructions and cause the processor to: generate a per-prefix router affinity score to localize internet access on a given gateway node most closely associated with a given one of the plurality of branch nodes.

Aspect 12. The system of any of Aspects 8 to 11, wherein the per-prefix router affinity score includes multiple affinity scores that span across the plurality of gateways in order of preference to a given gateway.

Aspect 13. The system of any of Aspects 8 to 12, wherein the processor is configured to execute the instructions and cause the processor to: provide a redundancy connection, where one or more failures occur through a full-mesh connectivity from the plurality of branch nodes to the two or more gateway nodes Aspect 14. The system of any of Aspects 8 to 13, wherein the two or more gateway nodes comprise more than four gateway nodes.

Aspect 15. A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: determine at two or more gateway nodes that each communicate with a plurality of branch nodes and a plurality of resources dynamically a path between each of the plurality of branch nodes and each of the plurality of resources, wherein the path includes one or more virtual routers; generate at the two or more gateways dynamically a path length based upon a number of virtual routers each path traverses; automatically translate the path length to an overlay management protocol route preference for each of the plurality of resources.

Aspect 16. The computer readable medium of Aspect 15, wherein the resources are one of a virtual network, an anycast virtual network, and/or firewall through which traffic flows to internet.

Aspect 17. The computer readable medium of any of Aspects 15 to 16, wherein the path length increases as the number of virtual routers in the path increases.

Aspect 18. The computer readable medium of any of Aspects 15 to 17, wherein the processor is configured to execute the computer readable medium and cause the processor to: generate a per-prefix router affinity score to localize internet access on a given gateway node most closely associated with a given one of the plurality of branch nodes.

Aspect 19. The computer readable medium of any of Aspects 15 to 18, wherein the per-prefix router affinity score includes multiple affinity scores that span across the plurality of gateways in order of preference to a given gateway.

Aspect 20. The computer readable medium of any of Aspects 15 to 19, wherein the processor is configured to execute the computer readable medium and cause the processor to: provide a redundancy connection, where one or more failures occur through a full-mesh connectivity from the plurality of branch nodes to the two or more gateway nodes.

Aspect 21. The computer readable medium of any of Aspects 15 to 20, wherein the two or more gateway nodes comprise more than four gateway nodes.

Aspect 22. A method comprising: determining, at two or more gateway nodes that each communicate with a plurality of branch nodes and a plurality of resources, dynamically a path between each of the plurality of branch nodes and each of the plurality of resources, wherein the path includes one or more virtual routers; generating, at the two or more gateways, dynamically a per-prefix-router-affinity that is assigned per-prefix of each of the plurality of resources; automatically selecting, based upon the per-prefix-router-affinity, a per-prefix path between each of the plurality of branch nodes and each of the plurality of resources with the lowest per-prefix-router affinity.

Aspect 23. The method of Aspect 22, wherein the per-prefix-router-affinity includes one or more redundancies.

Aspect 24. A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: determine at two or more gateway nodes that each communicate with a plurality of branch nodes and a plurality of resources dynamically a path between each of the plurality of branch nodes and each of the plurality of resources, wherein the path includes one or more virtual routers; generate, at the two or more gateways, dynamically a per-prefix-router-affinity that is assigned per-prefix of each of the plurality of resources; automatically select, based upon the per-prefix-router-affinity, a per-prefix path between each of the plurality of branch nodes and each of the plurality of resources with the lowest per-prefix-router affinity.

Aspect 25. The medium of Aspect 24, wherein the per-prefix-router-affinity includes one or more redundancies.

Aspect 26. A system includes a storage (implemented in circuitry) configured to store instructions and a processor. The processor configured to execute the instructions and cause the processor to: determine at two or more gateway nodes that each communicate with a plurality of branch nodes and a plurality of resources dynamically a path between each of the plurality of branch nodes and each of the plurality of resources, wherein the path includes one or more virtual routers; generate, at the two or more gateways, dynamically a per-prefix-router-affinity that is assigned per-prefix of each of the plurality of resources; automatically select, based upon the per-prefix-router-affinity, a per-prefix path between each of the plurality of branch nodes and each of the plurality of resources with the lowest per-prefix-router affinity.

Aspect 27. The system of Aspect 26, wherein the per-prefix-router-affinity includes one or more redundancies.

What is claimed is:

1. A method comprising:
   dynamically determining, at two or more gateway nodes that each communicate with a plurality of branch nodes and a plurality of resources, a corresponding path between each of the plurality of branch nodes and each of the plurality of resources, wherein the corresponding path includes one or more virtual routers;
   dynamically generating, at the two or more gateways, a corresponding path length for each corresponding path based upon a number of virtual routers each corresponding path traverses; and
   automatically translating the corresponding path length to an overlay management protocol route preference for each of the plurality of resources.

2. The method of claim 1, wherein the resources are one of a virtual network, an anycast virtual network, and/or firewall through which traffic flows to internet.

3. The method of claim 1, wherein the corresponding path length increases as the number of virtual routers in the corresponding path increases.

4. The method of claim 1, further comprising generating a per-prefix router affinity score to localize internet access on a given gateway node most closely associated with a given one of the plurality of branch nodes.

5. The method of claim 4, wherein the per-prefix router affinity score includes multiple affinity scores that span across the plurality of gateways in order of preference to a given gateway.

6. The method of claim 1, further comprising providing a redundancy connection, where one or more failures occur through a full-mesh connectivity from the plurality of branch nodes to the two or more gateway nodes.

7. The method of claim 6, wherein the two or more gateway nodes comprise more than four gateway nodes.

8. The method of claim 1, further comprising: establishing a dangling virtual routing service coupled to a single one of a plurality of virtual routing services, so that all paths to and from the plurality of resources coupled to the dangling virtual routing service flow through the single one of the plurality of virtual routing services.

9. A system comprising:
a storage configured to store instructions; and
a processor configured to execute the instructions and cause the processor to:
dynamically determine, at two or more gateway nodes that each communicate with a plurality of branch nodes and a plurality of resources, a corresponding path between each of the plurality of branch nodes and each of the plurality of resources, wherein the corresponding path includes one or more virtual routers;
dynamically generate at the two or more gateways a corresponding path length for each corresponding path based upon a number of virtual routers each corresponding path traverses; and
automatically translate the corresponding path length to an overlay management protocol route preference for each of the plurality of resources.

10. The system of claim 9, wherein the resources are one of a virtual network, an anycast virtual network, and/or firewall through which traffic flows to internet.

11. The system of claim 9, wherein the corresponding path length increases as the number of virtual routers in the corresponding path increases.

12. The system of claim 9, wherein the processor is configured to execute the instructions and cause the processor to: generate a per-prefix router affinity score to localize internet access on a given gateway node most closely associated with a given one of the plurality of branch nodes.

13. The system of claim 12, wherein the per-prefix router affinity score includes multiple affinity scores that span across the plurality of gateways in order of preference to a given gateway.

14. The system of claim 9, wherein the processor is configured to execute the instructions and cause the processor to: provide a redundancy connection, where one or more failures occur through a full-mesh connectivity from the plurality of branch nodes to the two or more gateway nodes.

15. A non-transitory computer readable medium comprising computer-readable instructions stored therein, which when executed by a computing system, cause the computing system to:
dynamically determine at two or more gateway nodes that each communicate with a plurality of branch nodes and a plurality of resources a corresponding path between each of the plurality of branch nodes and each of the plurality of resources, wherein the corresponding path includes one or more virtual routers;
dynamically generate at the two or more gateways a corresponding path length based upon a number of virtual routers each corresponding path traverses; and
automatically translate the corresponding path length to an overlay management protocol route preference for each of the plurality of resources.

16. The computer readable medium of claim 15, wherein the resources are one of a virtual network, an anycast virtual network, and/or firewall through which traffic flows to internet.

17. The computer readable medium of claim 15, wherein the corresponding path length increases as the number of virtual routers in the corresponding path increases.

18. The computer readable medium of claim 15, wherein the computer readable medium further comprises computer-readable instructions, which when executed by the computing system, cause the computing system to:
generate a per-prefix router affinity score to localize internet access on a given gateway node most closely associated with a given one of the plurality of branch nodes.

19. The computer readable medium of claim 18, the per-prefix router affinity score includes multiple affinity scores that span across the plurality of gateways in order of preference to a given gateway.

20. The computer readable medium of claim 15, wherein the computer readable medium further comprises computer-readable instructions, which when executed by the computing system, cause the computing system to:
provide a redundancy connection, where one or more failures occur through a full-mesh connectivity from the plurality of branch nodes to the two or more gateway nodes.

* * * * *